(12) United States Patent
Chauhan et al.

(10) Patent No.: US 12,293,107 B2
(45) Date of Patent: May 6, 2025

(54) METHOD AND APPARATUS TO PERFORM A MULTIPLE BIT COLUMN READ USING A SINGLE BIT PER COLUMN MEMORY ACCESSIBLE BY ROW AND/OR BY COLUMN

(71) Applicant: Intel Corporation, Santa Clara, CA (US)

(72) Inventors: Chetan Chauhan, Folsom, CA (US); Sourabh Dongaonkar, Portland, OR (US); Jawad B. Khan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 671 days.

(21) Appl. No.: 17/519,799

(22) Filed: Nov. 5, 2021

(65) Prior Publication Data

US 2022/0057961 A1 Feb. 24, 2022

(51) Int. Cl.
*G06F 3/00* (2006.01)
*G06F 3/06* (2006.01)
(52) U.S. Cl.
CPC .......... *G06F 3/0655* (2013.01); *G06F 3/0604* (2013.01); *G06F 3/0679* (2013.01)

(58) Field of Classification Search
CPC ..... G06F 3/0655; G06F 3/0604; G06F 3/0679
See application file for complete search history.

(56) References Cited

U.S. PATENT DOCUMENTS

| | | | |
|---|---|---|---|
| 2019/0146717 A1* | 5/2019 | Khan | G06F 12/0646 711/154 |
| 2020/0219580 A1 | 7/2020 | Khan et al. | |
| 2021/0407564 A1 | 12/2021 | Dongaonkar et al. | |
| 2023/0066419 A1* | 3/2023 | Rajendiran | G11C 13/0023 |

* cited by examiner

*Primary Examiner* — Craig S Goldschmidt
(74) *Attorney, Agent, or Firm* — Compass IP Law PC

(57) ABSTRACT

A memory accessed by rows and/or by columns in which an array of bits can be physically stored physical one-bit wide columns with each bit of the multi-bit wide logical column stored in a one-bit physical column in a different physical die. The multi-bit column is read by reading a one-bit physical column in each of the different physical die in parallel. The multi-bit wide logical column is arranged diagonally across M physical rows and M one-bit physical columns with each bit of the multi-bit wide logical column in the logical row stored in a different physical row and physical one-bit wide column in one of plurality of dies.

20 Claims, 9 Drawing Sheets

| Address | 0 | 1 | 2 | 3 | | 124 | 125 | 126 | 127 |
|---|---|---|---|---|---|---|---|---|---|
| 0 | 0101 | ####### | ####### | ####### | ... | ####### | ####### | ####### | ####### |
| 1 | 1000 | ####### | ####### | ####### | ... | ####### | ####### | ####### | ####### |
| 2 | 0110 | ####### | ####### | ####### | ... | ####### | ####### | ####### | ####### |
| 3 | 0001 | ####### | ####### | ####### | ... | ####### | ####### | ####### | ####### |
| 4 | 1111 | ####### | ####### | ####### | ... | ####### | ####### | ####### | ####### |
| 5 | 0011 | ####### | ####### | ####### | ... | ####### | ####### | ####### | ####### |
| 6 | 1111 | ####### | ####### | ####### | ... | ####### | ####### | ####### | ####### |
| 7 | 0010 | ####### | ####### | ####### | ... | ####### | ####### | ####### | ####### |
| ... | ... | ... | ... | ... | ... | ... | ... | ... | ... |
| 120 | 1010 | ####### | ####### | ####### | ... | ####### | ####### | ####### | ####### |
| 121 | 1010 | ####### | ####### | ####### | ... | ####### | ####### | ####### | ####### |
| 122 | 1101 | ####### | ####### | ####### | ... | ####### | ####### | ####### | ####### |
| 123 | 0101 | ####### | ####### | ####### | ... | ####### | ####### | ####### | ####### |
| 124 | 0000 | ####### | ####### | ####### | ... | ####### | ####### | ####### | ####### |
| 125 | 0110 | ####### | ####### | ####### | ... | ####### | ####### | ####### | ####### |
| 126 | 1000 | ####### | ####### | ####### | ... | ####### | ####### | ####### | ####### |
| 127 | 1100 | ####### | ####### | ####### | ... | ####### | ####### | ####### | ####### |

METHOD AND APPARATUS TO PERFORM A MULTIPLE BIT COLUMN READ USING A SINGLE BIT PER COLUMN MEMORY ACCESSIBLE BY ROW AND/OR BY COLUMN

FIELD

This disclosure relates to a single bit column read enabled memory accessible by row and/or by column and in particular to a multiple bit column read of data stored in the memory.

BACKGROUND

In matrix multiplication or matrix addition operations, data is manipulated by a compute device in rows and columns. Matrix data is stored in memory in a row-major format or column-major format. In a row-major format, consecutive elements of the rows of the matrix are stored in contiguous physical addresses in a memory device. Conversely, in a column-major format, consecutive elements of the columns are stored in contiguous physical addresses in a memory device. A matrix multiplication operation involves reading a given matrix in row-major format, reading another matrix in column-major format, and multiplying the respective rows and columns with one another.

An object recognition system for an artificial intelligence application may analyze thousands of images of objects stored in a memory so that it can learn to find visual patterns in an image to identify an object. The volume of data used in large-scale similarity searches is an extremely challenging problem that is both compute and memory intensive.

Memory that can be accessed by rows and/or by columns can allow for faster performance of processes such as similarity search, databases, and genomic analysis, among others.

BRIEF DESCRIPTION OF THE DRAWINGS

Features of embodiments of the claimed subject matter will become apparent as the following detailed description proceeds, and upon reference to the drawings, in which like numerals depict like parts, and in which:

FIG. 4 illustrates an example of an logical representation of a 128×128 array;

FIG. 5 illustrates a physical layout of the array of bits shown in FIG. 4 stored diagonally across Q physical rows and Q physical one-bit wide columns for a single partition across R non-volatile memory dies;

Figure 1:
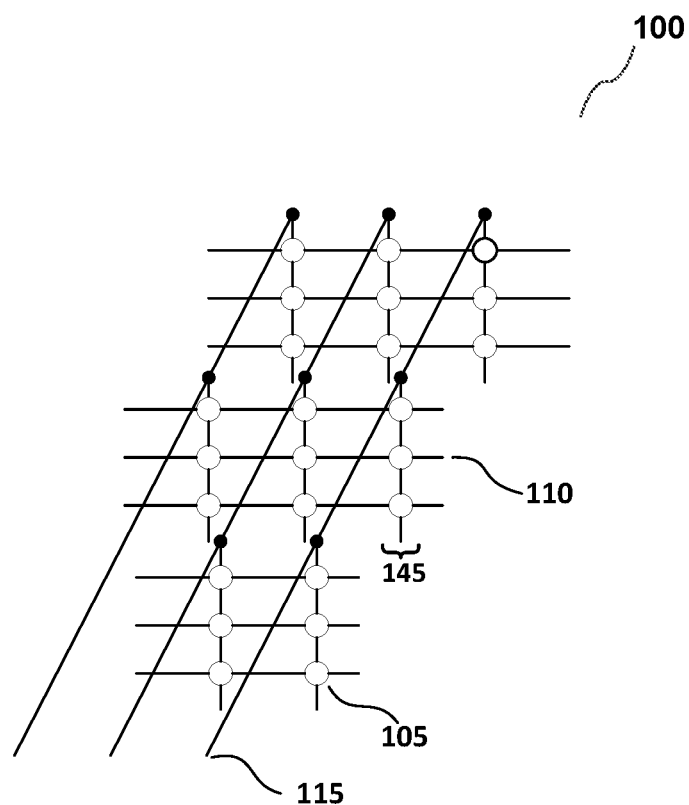
FIG. 1 is an example of a cross-point memory array that includes a plurality of memory cells.

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined as set forth in the accompanying claims.

DESCRIPTION OF EMBODIMENTS

A memory cell in a three dimensional cross-point memory can be addressed individually allowing data to be written and read on a per-bit basis. Each row of memory cells in the three dimensional cross-point memory is connected to a word line, and each column of memory cells is connected to a bit line with a memory cell located at the intersection of a word line and a bit line.

The cross-point memory can be logically partitioned into a plurality of partitions with each partition having a plurality of tiles and each tile including one or more memory cells. To perform efficient searches, database elements (for example, records, vectors, rows) are written to the cross point memory array in binary format (ones and zeros) as hash codes (sequences of values produced by a hashing function), that are sparse (have more zeros (clear bits) than ones (set bits)). The ones (set bits) encode the information and are used to search for matches. A column read can be used to read bitwise data across all of the tiles.

A delay time which can be referred to as a Partition Busy Time is required prior to a subsequent column-wise read to the same partition. The Partition Busy Time can be 20 times longer than the time to perform one read from a partition. The delay time is not required prior to a subsequent column-wise read from another partition.

To reduce the delay time, an array of bits can be physically stored in a physical block of memory in M physical rows and M physical columns such that a one-bit wide logical column is arranged diagonally across the M physical rows and M physical columns with each bit of the one-bit wide logical column in a different physical row and physical column.

The one-bit wide logical column restricts the usage of logical column reads to applications where data can be encoded in bitwise fashion and bit operations can be utilized. Furthermore, M physical rows per die need to be kept physically together in a die so that the M one-bit physical columns can be arranged diagonally across the M physical rows. Moreover, as multiple dies are typically connected to the same command-address (CA) bus, 4M rows (M rows per die) need to be kept physically together for 4 dies in parallel.

To ensure uniform wear of memory elements in the three dimensional cross-point memory, a media management operation periodically moves data within the three dimensional cross-point memory. The M physical rows and M physical columns in each of the dies must be moved together requiring 4M row reads and 4M row writes. As all of the row reads and row writes are to the same partition, the media management operation imposes a significant performance penalty.

To reduce the number of physical rows used to store the array of bits, the array of bits can be physically stored in physical one-bit wide columns with each bit of the multi-bit wide logical column stored in a one-bit physical column in a different physical die. The multi-bit column is read by reading a one-bit physical column at a same row address and column address in each of the different physical die in parallel.

The multi-bit wide logical column is arranged diagonally across M physical rows and M one-bit physical columns with each bit of the multi-bit wide logical column in the logical row stored in a different physical row and physical one-bit wide column in one of plurality of dies.

With multiple dies connected to the same Command Address (CA) bus, a multi-bit column is read by reading in parallel a one-bit column from each of the dies at a same row/column address. For example, with 4 dies connected to the CA bus, 4 bits are read in parallel, one bit from each of the 4 dies for each column read. M rows per die need to be kept physically together for 4 dies in parallel. The number of rows to be written and kept physically together in the media is reduced by the number of one-bit dies read in parallel for a multi-bit column read, significantly simplifying the media management requirements. Media management is simpler by reducing the number of rows that need to be written together and kept physically together, to keep the diagonal column structure intact. For example, a 512 bit column can be stored in 128 rows, with one bit stored diagonally across each of four dies, that is the number of rows used in a die is decreased by 4.

The use of a multi-bit wide column across multiple dies allows a column Error Correction Code (ECC) to be embedded with the data written to the multi-bit wide column. By having columns multiple bits/bytes wide and columns ECC protected makes column ECC easier to implement in a system without a need of additional circuitry.

Reading multiple bits per column entry from the three dimensional cross-point memory alleviates media management challenges, and enables ECC corrected column reads for arbitrary data types.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

FIG. 1 is an example of a cross-point memory array 100 that includes a plurality of memory cells 105. The cross-point memory array 100 is a byte-addressable, write-in-place non-volatile memory. A non-volatile memory (NVM) device is a type of memory whose state is determinate even if power is interrupted to the device.

In an embodiment, each memory cell 105 includes a material with a crystalline or an amorphous atomic configuration that may have different electrical resistances. A voltage applied to the memory cell 105 results in a different current dependent on whether the material is in a crystalline or an amorphous state, and the magnitude of the resulting current may be used to determine the logic state stored by memory cell 105.

Cross-point memory array 100 may be a three dimensional cross-point memory (3D cross-point memory) array that includes a plurality of levels of two-dimensional (2D) memory arrays formed on top of one another and separated by an electrically insulating material. In the embodiment shown in FIG. 1, cross-point memory array 100 includes three levels; however, the number of levels is not limited to three. The electrically insulating material may be thermally insulating and may contain multiple sublayers to increase the thermal resistance between each level. Each level may be aligned or positioned so that memory cells 105 may be approximately aligned with one another across each level, forming a memory cell stack 145.

Each row of memory cells 105 is connected to a word line 110, and each column of memory cells 105 is connected to a bit line 115 with a memory cell 105 located at the intersection of a word line 110 and a bit line 115. In an embodiment, word lines 110 and bit lines 115 may be substantially perpendicular to one another to create an array.

The memory cells 105 can function in a two-terminal architecture with a particular word line 110 and bit line 115 serving as the electrodes for the memory cells 105. Each memory cell 105 can be addressed individually allowing data to be written and read on a per-bit basis. Word lines 110 and bit lines 115 may be made of conductive materials, such as metals (for example, copper, aluminum, gold, tungsten, titanium), metal alloys, carbon, or other conductive materials, alloys, or compounds.

In operation, a memory cell 105 of cross-point memory array 100 can be written by applying a voltage, across the memory cell 105 via a selected word line 110 and bit line 115. A memory cell 105 of the cross-point memory array 100 can be read by sensing current on a bit line 115 corresponding to the respective memory cell 105 responsive to a particular voltage applied to the selected word line 110 to which the respective memory cell is coupled.

The magnitude of the current sensed is dependent on the electrical resistance of the memory cell 105 and may be used to differentiate between the electrically resistive states of the phase change material. In some cases, sensing may depend on a threshold voltage $V^{th}$, a voltage at which point a current begins to flow.

The state of the memory cell 105 may be a low resistance crystalline state or a high resistance amorphous state, the state is used to represent whether the memory cell stores a logic (binary) '1' (a bit is "set") or logic (binary) '0' (a bit is "clear"). In an embodiment, the low resistance state represents a logic '0' and the high resistance state represents a logic '1'.

Figure 2:
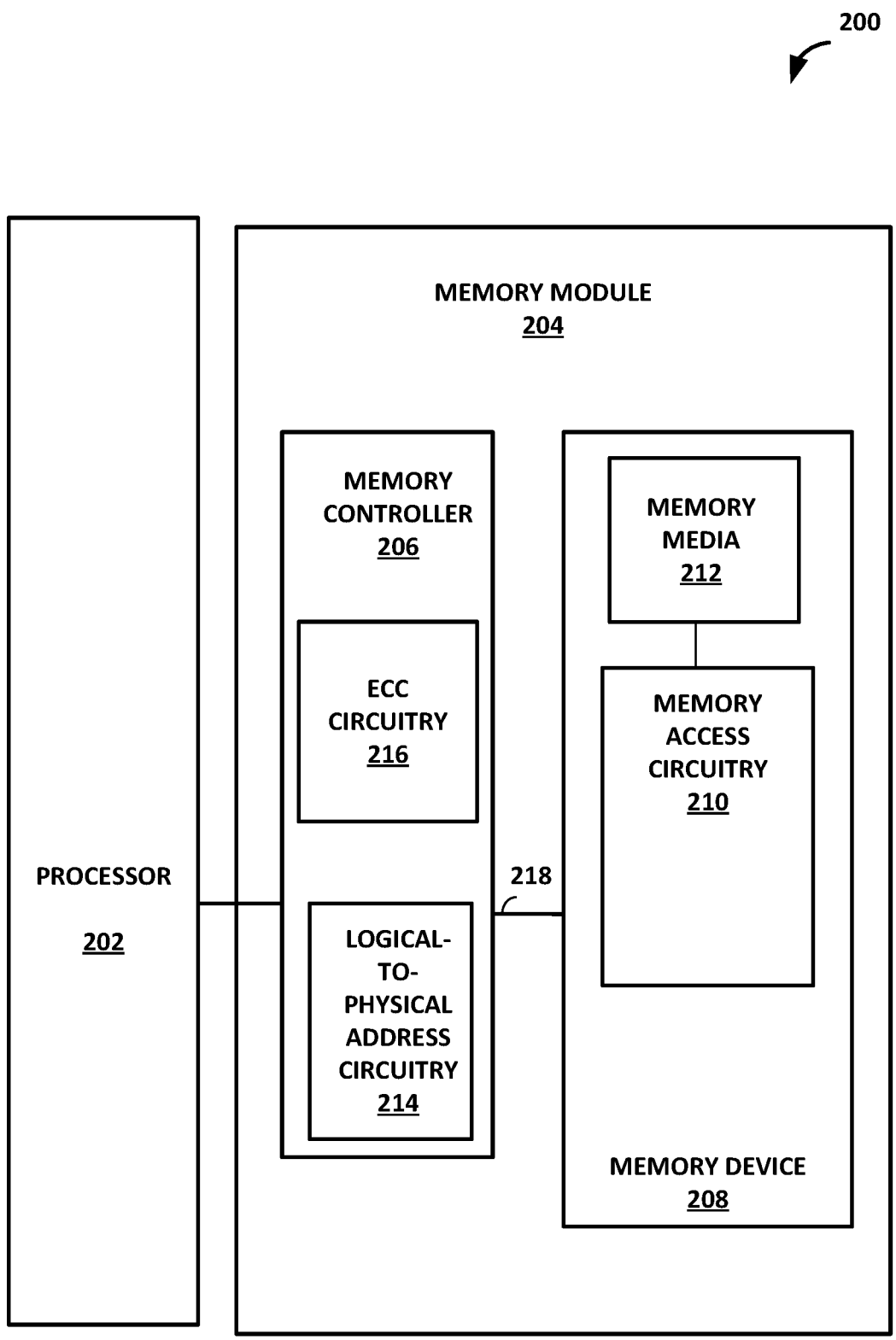
FIG. 2 is a block diagram of a compute device that includes the cross-point memory array shown in FIG. 1.

FIG. 2 is a block diagram of a compute device 200. The compute device 200 includes a processor 202 and a memory module 204. The memory module 204 can also be referred to as a memory subsystem. The memory module 204 includes a memory controller 206 and a memory device 208 connected to a shared command/address bus 218. The memory device 208 includes memory access circuitry 210 and memory media 212.

In an embodiment, the memory media is the cross-point memory array 100. The memory controller 206 includes logical-to-physical address translation circuitry 214 to convert a logical row address and a logical column address to a physical row address and a physical column address in the memory media 212 in the memory device 208.

The memory controller circuitry 206 also includes Error Correction Code (ECC) circuitry 216. Prior to writing a matrix to the memory media 212, parity bits are generated for both the rows and columns and buffered in the memory controller 206. When the matrix level parity calculations are complete, the parity and data for the matrix are written to the memory media 212. The ECC circuitry 216 can perform error correction for a column ECC and a row ECC when reading a column or a row.

The memory controller 206, can be any device or circuitry to selectively read from and/or write to the memory media 212, for example, in response to requests from the processor 202, which may be executing an application seeking to read from or write to the memory media 212.

The processor 202 can be embodied as any device or circuitry (e.g., a multi-core processor(s), a microcontroller, or other processor or processing/controlling circuit) capable of performing operations described herein, such as executing an application, for example, similarity search, database searches, and matrix operations. In some embodiments, the processor 202 may be embodied as, include, or be coupled to a field-programmable gate array (FPGA), an application specific integrated circuit (ASIC), a system-on-a-chip (SoC), reconfigurable hardware or hardware circuitry, or other specialized hardware to facilitate performance of the functions described herein.

The memory controller 206 can read individual bits stored in columns in the cross-point memory array 100 for use in performing similarity searches, also referred to as "stochastic associative searches" (SAS). The memory controller 206 can access multiple cells in parallel within a given partition in the cross-point memory array 100.

The cross-point memory array 100 can be logically partitioned into a plurality of partitions with each partition having a plurality of tiles. Each tile can include one or more cells 105. In an embodiment, each tile has 128 cells (bits).

Figure 3:
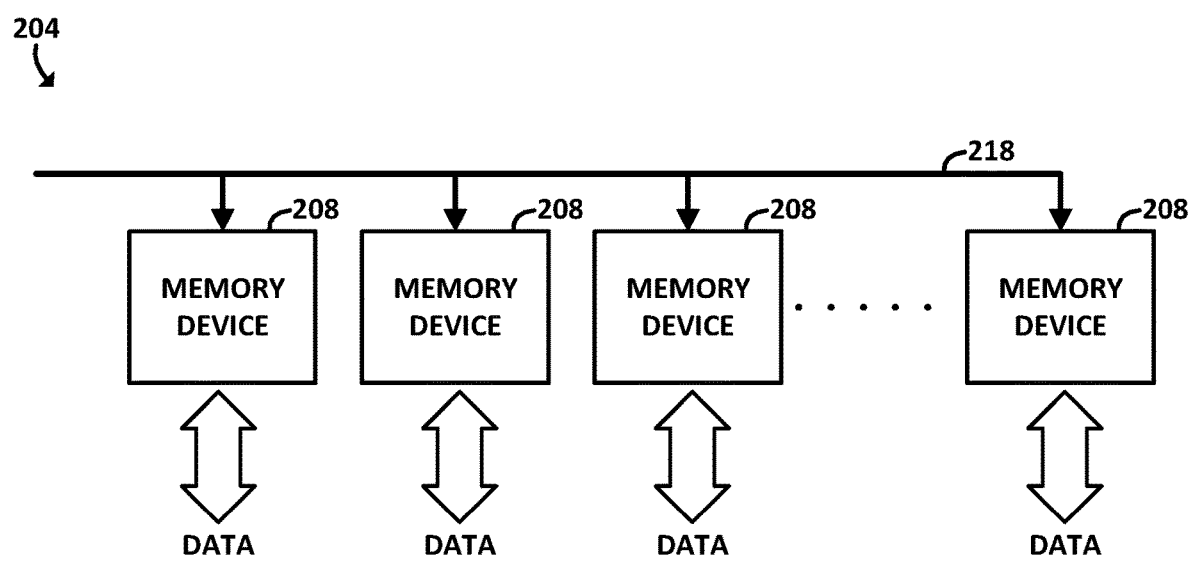
FIG. 3 is a block diagram of the memory module shown in FIG. 2 that includes multiple dies of the memory device shown in FIG. 2.

FIG. 3 is a block diagram of the memory module 204 shown in FIG. 2 that includes multiple dies of the memory device 208 shown in FIG. 2. The memory module 204 can be a Dual In-line Memory Module (DIMM). Multiple dies of the cross-point memory array 100 in the memory devices 208 on the memory module 204 are connected to a shared command/address bus 218. As such, in operation, data stored in the cross-point memory array 100 in the memory devices 208 on the memory module 204 is read in parallel from the dies of the cross-point memory array 100 in the memory devices 208 connected to the shared command/address bus 218. Data may be stored in the cross-point memory array 100 in a configuration to allow reading of entries in the same logical column that are stored in each of the dies of the cross-point memory array 100 in memory devices 208.

One of the memory devices 208 can be used to store row Error Correcting Code (ECC) for data stored in a row across a plurality of the dies of the cross-point memory array 100 in the memory module 204. Another one of the memory devices 208 can be used to store metadata for the data stored in a row across a plurality of the dies of the cross-point memory array 100 in memory devices 208 in the memory module 204. In an embodiment, there are six memory devices 208 on the memory module 204, four to store data, one to store metadata and one to store row ECC.

FIG. 4 illustrates an example of an logical representation of a 128×128 array 400. The array has 128 logical rows 406 and 128 logical columns 404. Each entry 402 in the 128×128 array 400 is 4 bits wide. As shown in FIG. 4, the entry 402 at logical column 0, logical row 0 stores 4 bits '0101'.

Figure 5:
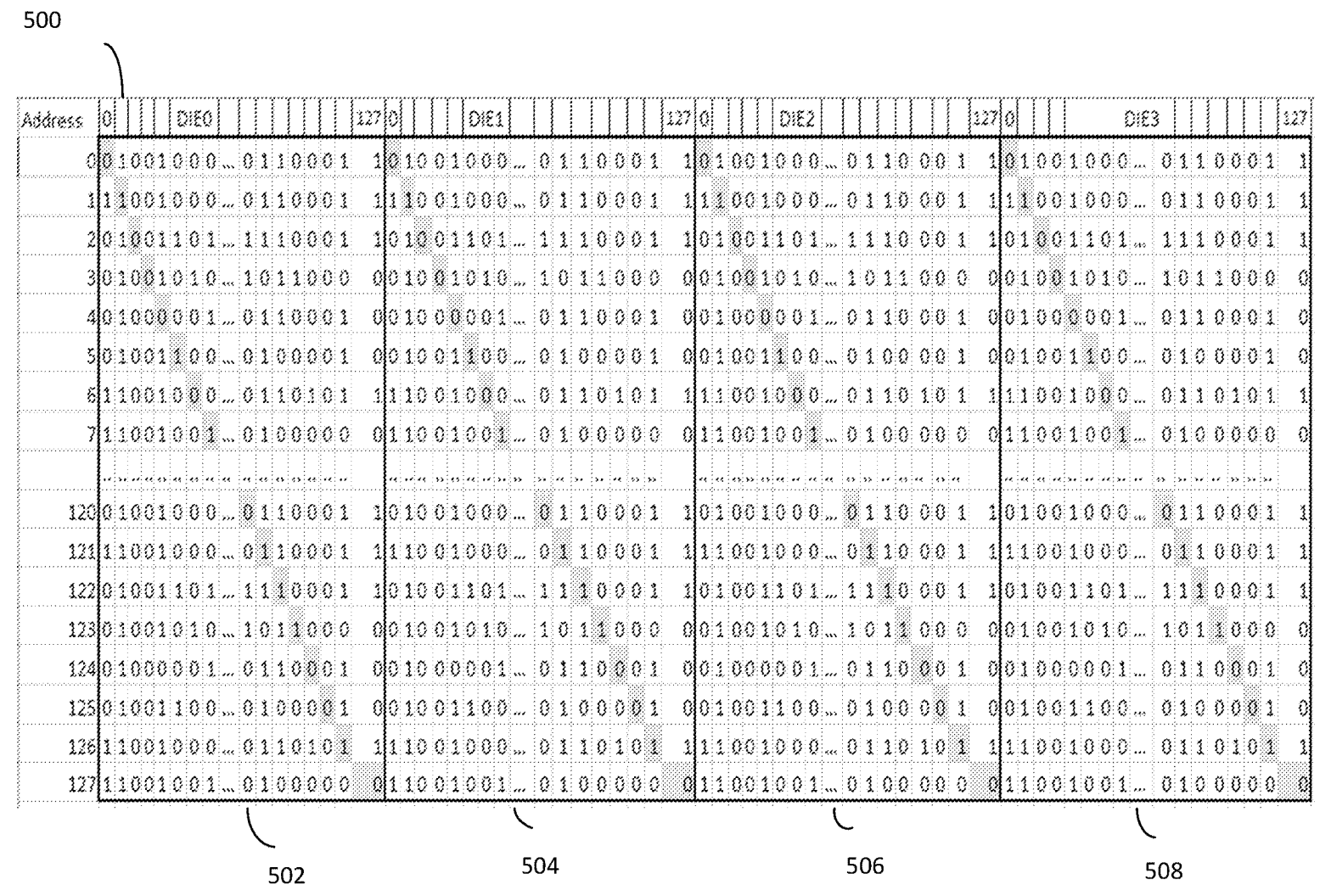

FIG. 5 illustrates a physical layout of the array of bits 400 shown in FIG. 4 stored diagonally across Q physical rows and Q physical one-bit wide columns for a single partition 500 across R non-volatile memory dies. In the embodiment shown, each non-volatile memory die is a three dimensional cross-point memory die. There are Q physical rows (Q rows) and Q physical one-bit wide columns (Q columns) in each three dimensional cross-point memory die. Each one-bit column to store one-bit of a R-bit entry.

The number of physical rows that need to be written together and kept physically together in the three dimensional cross-point memory die to keep the diagonal column structure intact is dependent on the number of column entries in the array of bits 400. The number of bits per column entry can be increased without increasing the number of rows by storing the array of bits in multi-bit wide logical columns diagonally across Q physical rows and Q physical columns across R three dimensional cross-point memory die connected to the same Command Address (CA) bus. The multi-bit wide logical column has R-bit entries.

The multi-bit wide logical column that is arranged diagonally across physical rows and physical columns in one or more partitions in R three dimensional cross-point memory die is read by reading one bit from a row/column in each of the R three dimensional cross-point memory die in parallel from a first address (row/column) to read the first R-bit entry. The row and column is incremented by 1 to read the next bit from each of the R three dimensional cross-point memory die in parallel at the next address (next physical row address and next physical column address) in the plurality of three dimensional cross-point dies to read the next R-bit entry.

In the example shown in FIG. 5, R (number of dies) is four, Q (number of physical rows and number of physical columns) is 128 and M (number of bits in the logical column) is 512. There are four three dimensional cross-point memory dies 502, 504, 506, 508. Each row of each of the memory dies 502, 504, 506, 508 has 128 bits, one-bit per column. The diagonal column in each memory die 502, 504, 506, 508 has 128 one-bit entries. The first physical address for the multi-bit wide logical column arranged diagonally across 128 physical rows and 128 physical columns is row 0, column 0 of each of the four three dimensional cross-point memory dies 502, 504, 506, 508 and the last physical address is row 127, column 127 of each of the four three dimensional cross-point memory dies 502, 504, 506, 508.

Storing 1 bit per entry in a diagonal column in each of the four three dimensional cross-point memory dies 502, 504, 506, 508 with each 1 bit entry at a same physical row/column address in each of the four three dimensional cross-point memory dies 502, 504, 506, 508 and reading all four three dimensional cross-point memory dies 502, 504, 506, 508 in parallel reduces the number of physical rows that need to be written and kept physically together in the media by four (from 512 to 128 in the example shown in FIG. 5). Thereby, significantly simplifying the media management.

The memory controller 206 (FIG. 2) defines logical rows and logical columns in which, in a given logical column 404, each entry 402 in the logical column 404 is stored at a different physical row and physical column than any other entry 402 in that logical column 404. A first multi-bit entry in logical column 404 is written to a first physical row address and a first physical column address in each of the four three dimensional cross-point memory dies 502, 504, 506, 508, with one bit of the first multi-bit entry stored written to each of the four three dimensional cross-point memory dies 502, 504, 506, 508. The multi-bit wide entry with each of the bits stored in a same physical row address and same physical column address in one of the four three dimensional cross-point memory dies 502, 504, 506, 50 allows data types other than Boolean to be stored in the array of bits. The memory controller 206 includes circuitry to cause storage of the M-bit logical column of R-bit entries in the cross-point memory array diagonally across a partition.

A 4 bit wide logical column is arranged diagonally across physical rows and physical columns across four three dimensional cross-point memory dies 502, 504, 506, 508. The each 4 bit wide entry in the logical column is read by reading 4 bits in parallel at a first physical address (row/column). Each of the 4 bits in the 4-bit wide entry in the logical column is read from a different three dimensional cross-point memory die 502, 504, 506, 508. Both the row physical address and the column physical address are incremented by 1 to read the next 4 bits in parallel from the next physical address (row/column) by reading 4 bits in parallel from the next physical address (row/column).

In the example shown, there are four three dimensional cross-point memory dies 502, 504, 506, 508. Each physical row is 128 bits and each physical column is 1 bit wide in each of the three dimensional cross-point memory dies 502, 504, 506, 508. The array of bits is stored in 128 columns and 128 rows (Q=128) in each of the four three dimensional cross-point memory dies 502, 504, 506, 508.

Figure 6:
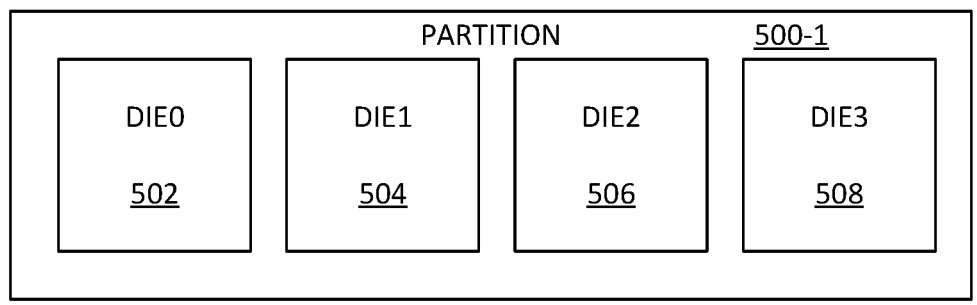
FIG. 6 illustrates an example of a plurality of partitions shown in FIG. 5 used to store an array of bits and column ECC diagonally across physical rows/columns in a plurality of three dimensional cross-point memory die.
Figure 6:
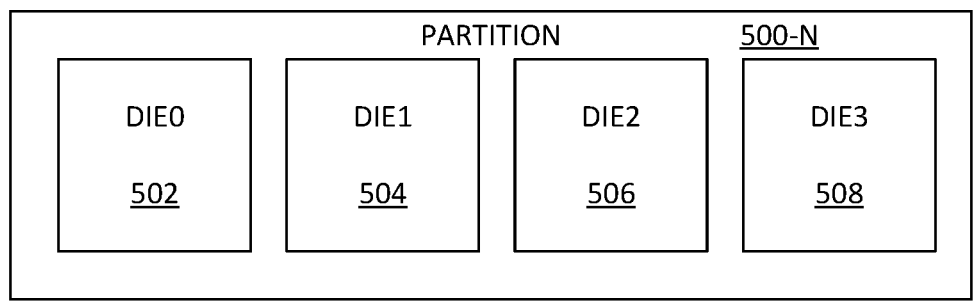
Figure 6:
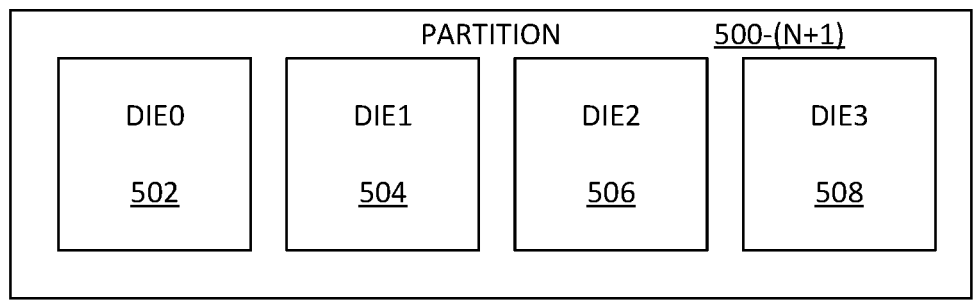
Figure 6:
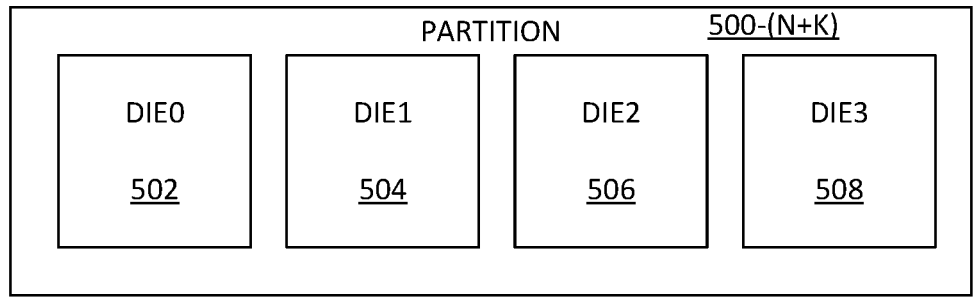

FIG. 6 illustrates an example of a plurality of partitions 500 shown in FIG. 5 used to store an array of bits and column ECC diagonally across physical rows/columns in a plurality of three dimensional cross-point memory die.

The number of bits in the logical column (M) can be further increased to include both S data bits and T ECC parity bits using a plurality of partitions 500 with four bits stored per column entry in each partition 500 as discussed in conjunction with the partition shown in FIG. 5. The number of partitions used to store S data bits is S/R (with R dies per partition, each die to store one data bit).

The T column ECC parity bits and S data bits can be embedded directly in the M-bit columns. The column ECC parity bits are independent of the row ECC parity bits. In the embodiment shown in FIG. 6, the T column ECC parity bits are stored in the same memory dies 502, 504, 506, 508 as the S data bits with the column ECC parity bits stored separately from the data bits in different partitions 500 in the memory dies 502, 504, 506, 508. The number of partitions used to store T parity bits is T/R (with R dies per partition, each die to store one parity bit). In other embodiments, the T column ECC parity bits can be stored in other memory dies separate from the memory dies 502, 504, 506, 508 used to store the S data bits.

In the embodiment shown in FIG. 6, N partitions 500-1, ... 500-N are used to store S data bits in consecutive rows of memory dies 502, 504, 506, 508. K partitions 500-(N+1), ..., 500-(N+K) are used to store column ECC parity bits for the column data stored in the N partitions in consecutive rows of memory dies 502, 504, 506, 508.

An advantage of the data layout shown in FIG. 6 is the programmability of the number of bits per column entry and the number of bits used for ECC protection. The general scheme is shown in FIG. 6, with the S data bits spread across first N partitions 500-1, ... 500-N in the four memory dies 502, 504, 506, 508 such that each column entry contains 4N bits. The next K partitions 500-(N+1), ..., 500-(N+K) store the corresponding 4K parity bits used for ECC protection of the data in the column.

To read a column with 128 entries, where each entry has 4N data bits and 4K parity bits, N+K partitions are read in sequence, starting with partition 500-1, and ending with partition 500-(N+K). Each 4(N+K) bit entry in the column is ECC corrected to provide ECC corrected 4N bits of data.

The number of data bits per column and the degree of ECC protection (number of ECC correction bits) can be selected based on the ECC protection requirements of an application. Different regions of the memory can use different N and K values based on the ECC protection requirements for the application. Moreover, the number of data bits per column and the number of ECC protection bits per column is programmable, and can accommodate different size (number of bits per column) column entries and ECC schemes.

With wider columns, the number of addresses that need to be kept physically together are reduced. In this case with 4-bit columns, the number of rows to be kept physically contiguous in the memory is reduced to 128 addresses per partition (from 512 addresses per partition). This significantly reduces the performance penalty associated with media management in the presence of column read.

In an embodiment, the 4N data bits can store 32-bits in a single-precision floating-point format, also referred to as FP32 or float32. The 32-bits are stored in eight partitions (N=8), with each partition 500 storing four bits, one bit per memory die 502, 504, 506, 508 arranged diagonally across physical rows and physical columns across four three dimensional cross-point memory dies 502, 504, 506, 508 as shown in FIG. 5. Nine parity bits for each 32 data bits are stored in the K partitions, with the first four parity bits stored in partition 500-(N+1), the next four parity bits stored in partition 500-(N+1) and the last parity bit (bit 9) stored in memory die 502 in partition 500-(N+K).

In another embodiment, the 4N data bits can store 16-bits in a half-precision floating-point format, also referred to as FP16 or float16. The 16-bits are stored in four partitions (N=4), with each partition 500 storing four bits, one bit per memory die 502, 504, 506, 508 arranged diagonally across physical rows and physical columns across four three dimensional cross-point memory dies 502, 504, 506, 508 as shown in FIG. 5. Nine parity bits for each 16 data bits are stored in the K partitions, with the first four parity bits stored in partition 500-(N+1), the next four parity bits stored in partition 500-(N+1) and the last parity bit (bit 9) stored in memory die 502 in partition 500-(N+K).

Other encoding schemes with different levels of error correction and overhead can be used based on suitability, for example, Hamming Codes, Bose-Chaudhuri-Hocquenghem (BCH) codes, or Reed-Solomon codes. The encoding scheme used is dependent on how many errors need to be corrected in the media, and how many parity bits are needed to correct errors.

Figure 7:
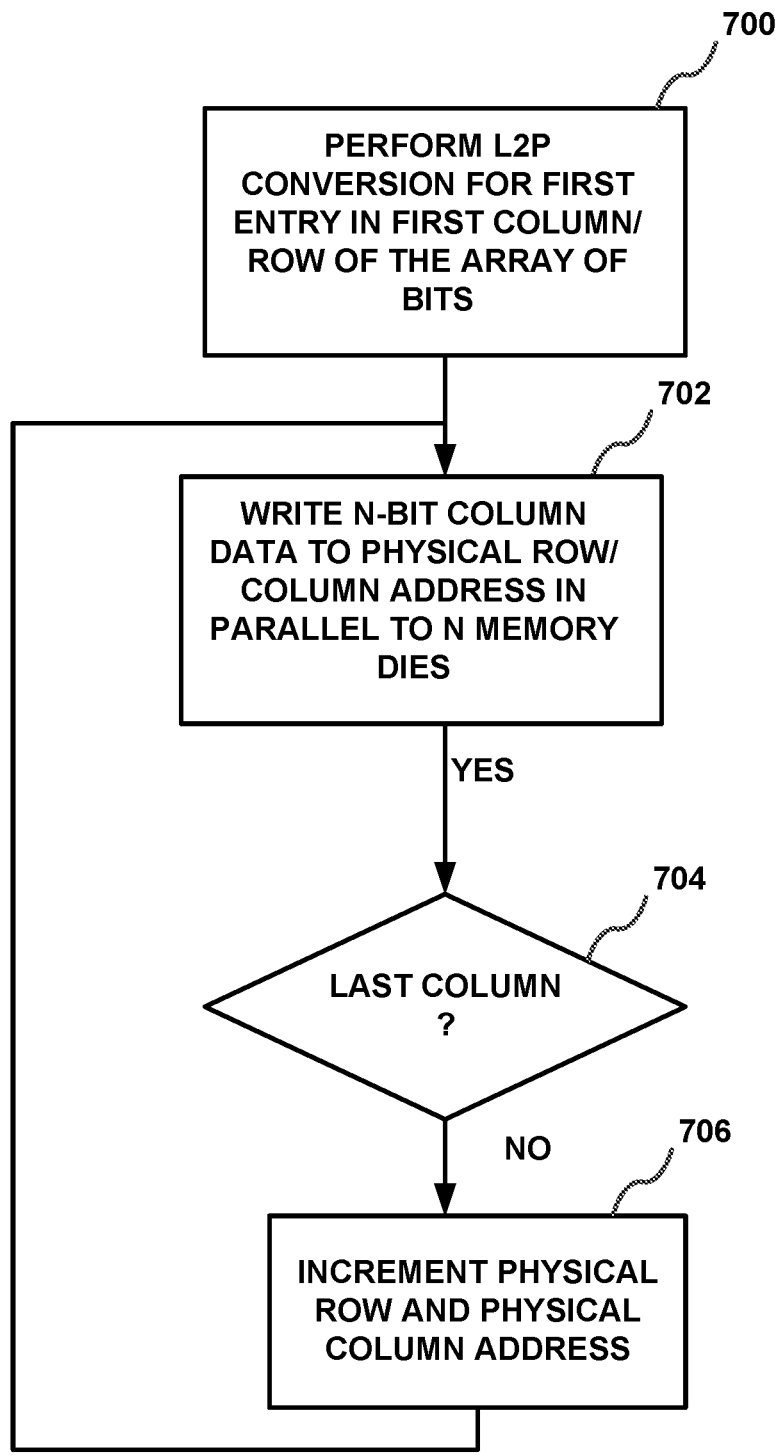
FIG. 7 is a flowgraph illustrating a method to write a N-bit wide logical column diagonally across physical rows/columns in parallel to N three dimensional cross-point memory dies.

FIG. 7 is a flowgraph illustrating a method to write a M-bit wide logical column diagonally across physical rows/columns in parallel to R three dimensional cross-point memory dies.

At block 700, the L2P circuitry 214 in the memory controller 206 performs a logical to physical address conversion for the first entry in the first column and first row of the array of bits to be stored in contiguous physical rows in the R three dimensional cross-point memory die. Processing continues with block 702.

At block 702, the memory access circuitry 210 writes the M-bit wide data to the memory at the physical row address and physical column address with one of the M bits written to the same physical row address and physical column address in each of the R memory die in parallel. Processing continues with block 704.

At block 704, the memory access circuitry 210 determines if the physical column to which the M-bit data is the last physical column entry to be written. If there is another column entry to be written, processing continues with block 706.

At block 706, the physical row address is incremented and the physical column address is incremented and used to write the next M-bit wide data to the memory such that the M-bit wide data is written diagonally across the rows and columns in the array of bits in each of the R memory die in parallel.

Figure 8:
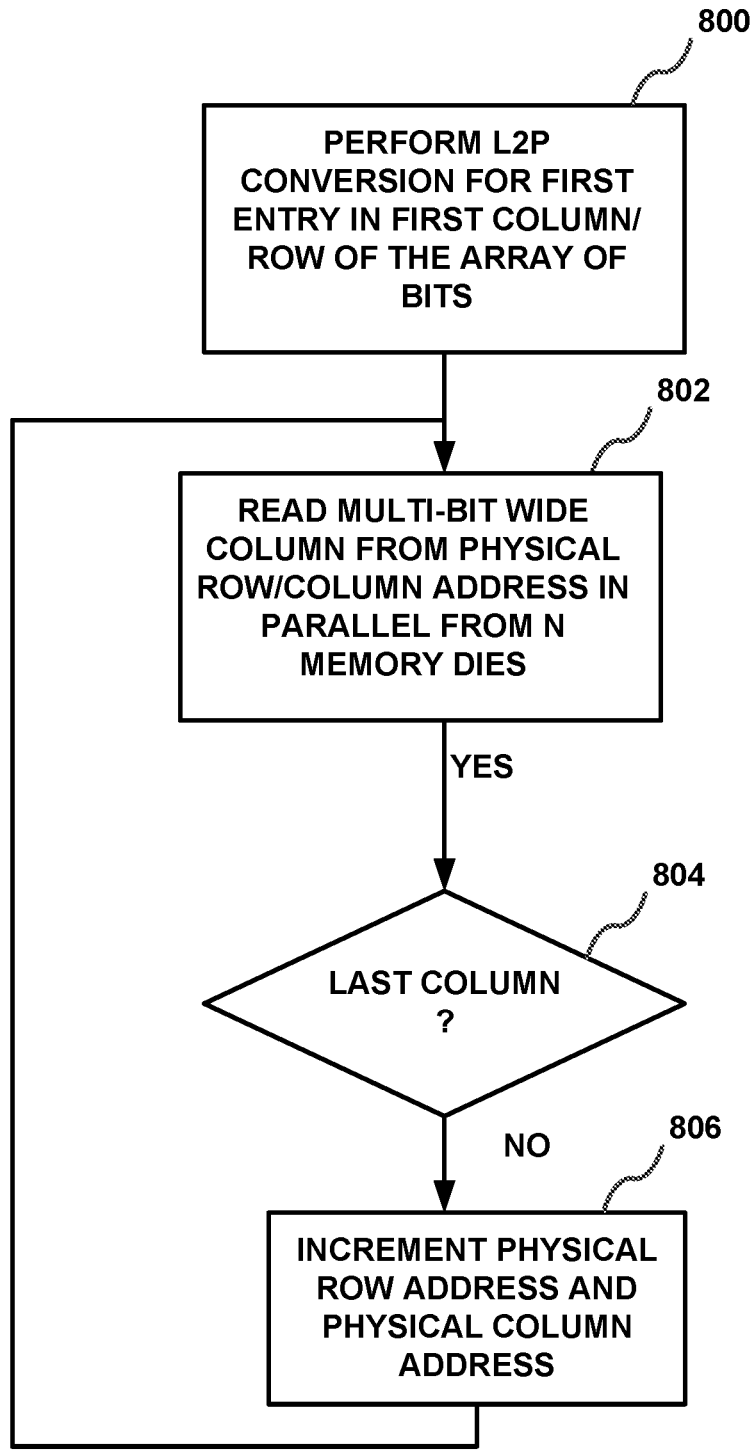
FIG. 8 is a flowgraph illustrating a method to read a N-bit wide logical column diagonally across physical rows/columns in parallel from N three dimensional cross-point memory die.

FIG. 8 is a flowgraph illustrating a method to read a M-bit wide logical column diagonally across physical rows/columns in parallel from R three dimensional cross-point memory die.

At block 800, the L2P circuitry 214 in memory controller 206 performs a logical to physical address conversion for the first entry in the first column and first row of the array of bits stored in a plurality of contiguous physical rows (for example, Q contiguous physical rows) in the R three dimensional cross-point memory die. Processing continues with block 802.

At block 802, the memory access circuitry 210 reads the M-bit wide data from the memory media 212 at the physical row and physical column address by reading one of the M-bits from the same physical row and physical column address in each of the R three dimensional cross-point memory die in parallel. Processing continues with block 804.

At block 804, the memory access circuitry 210 determines if the physical column to which the M-bit wide data is to be read is the last physical column entry for the array of bits. If there is another column entry to be read, processing continues with block 806.

At block 806, the physical row address is incremented and the physical column address is incremented and used to read the next M-bit wide data from the R memory dies, with one of the M bits read from each of the R memory dies in parallel such that the M-bit wide data is read diagonally across the rows and columns in the array of bits stored in contiguous rows in the R memory dies.

Figure 9:
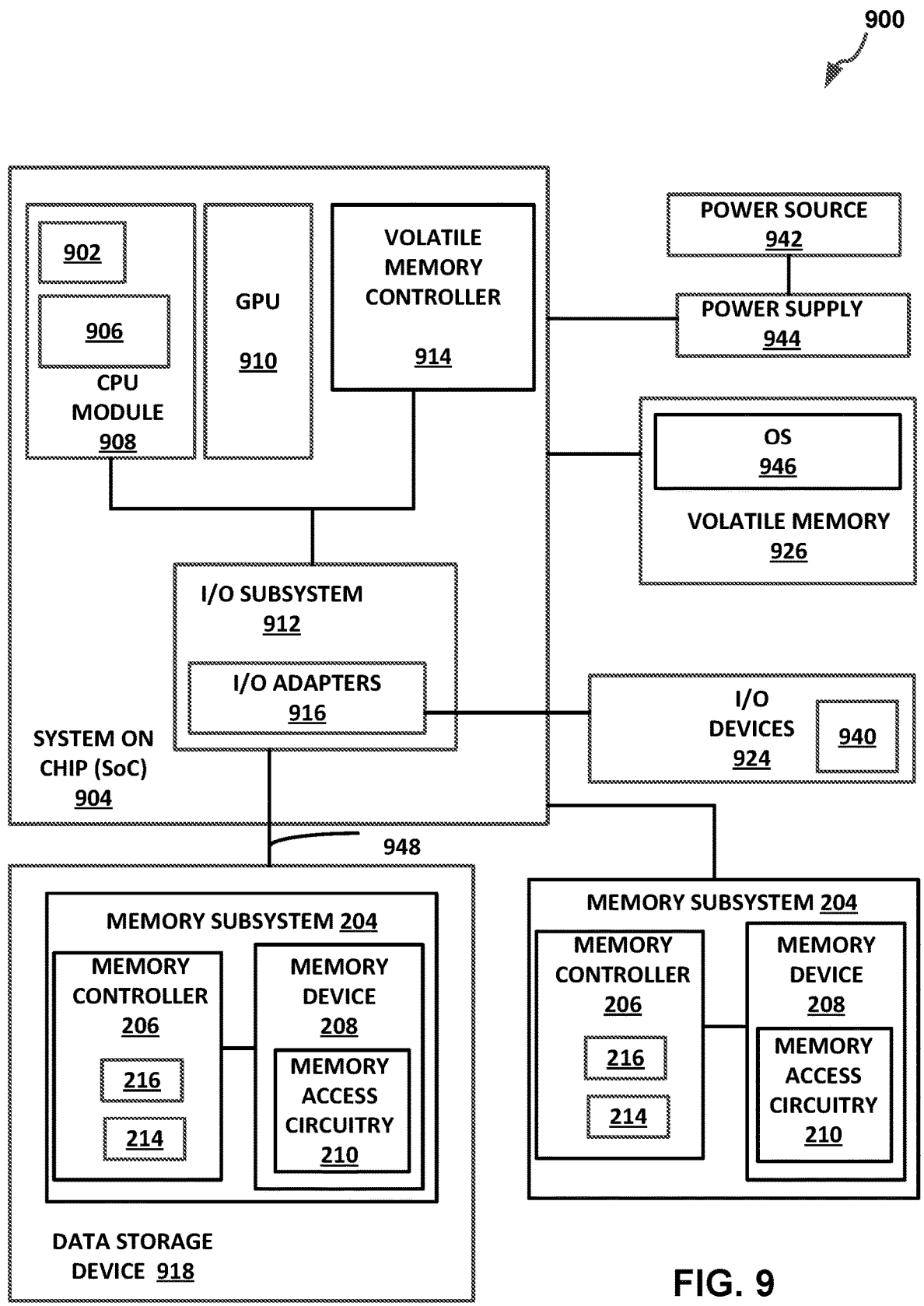
FIG. 9 is a block diagram of an embodiment of a computer system that includes the memory module.

FIG. 9 is a block diagram of an embodiment of a computer system 900 that includes the memory module 204. Memory module 204 includes memory device 208 and memory controller 206 that includes ECC circuitry 216 and L2P address circuitry 214. Computer system 900 can correspond to a computing device including, but not limited to, a server, a workstation computer, a desktop computer, a laptop computer, and/or a tablet computer.

The computer system 900 includes a system on chip (SOC or SoC) 904 which combines processor, graphics, memory, and Input/Output (I/O) control logic into one SoC package. The SoC 904 includes at least one Central Processing Unit (CPU) module 908, a volatile memory controller 914, and a Graphics Processor Unit (GPU) 910. In other embodiments, the volatile memory controller 914 can be external to the SoC 904. The CPU module 908 includes at least one processor core 902 and a level 2 (L2) cache 906.

Although not shown, each of the processor core(s) 902 can internally include one or more instruction/data caches, execution units, prefetch buffers, instruction queues, branch address calculation units, instruction decoders, floating point units, retirement units, etc. The CPU module 908 can correspond to a single core or a multi-core general purpose processor, such as those provided by Intel® Corporation, according to one embodiment.

The Graphics Processor Unit (GPU) 910 can include one or more GPU cores and a GPU cache which can store graphics related data for the GPU core. The GPU core can internally include one or more execution units and one or more instruction and data caches. Additionally, the Graphics Processor Unit (GPU) 910 can contain other graphics logic units that are not shown in FIG. 9, such as one or more vertex processing units, rasterization units, media processing units, and codecs.

Within the I/O subsystem 912, one or more I/O adapter(s) 916 are present to translate a host communication protocol utilized within the processor core(s) 902 to a protocol compatible with particular I/O devices. Some of the protocols that adapters can be utilized for translation include Peripheral Component Interconnect (PCI)-Express (PCIe); Universal Serial Bus (USB); Serial Advanced Technology Attachment (SATA) and Institute of Electrical and Electronics Engineers (IEEE) 1594 "Firewire".

The I/O adapter(s) 916 can communicate with external I/O devices 924 which can include, for example, user interface device(s) including a display and/or a touch-screen display 940, printer, keypad, keyboard, communication logic, wired and/or wireless, storage device(s) including hard disk drives ("HDD"), solid-state drives ("SSD"), removable storage media, Digital Video Disk (DVD) drive, Compact Disk (CD) drive, Redundant Array of Independent Disks (RAID), tape drive or other storage device. The storage devices can be communicatively and/or physically coupled together through one or more buses using one or more of a variety of protocols including, but not limited to, SAS (Serial Attached SCSI (Small Computer System Interface)), PCIe (Peripheral Component Interconnect Express), NVMe (NVM Express) over PCIe (Peripheral Component Interconnect Express), and SATA (Serial ATA (Advanced Technology Attachment)).

Additionally, there can be one or more wireless protocol I/O adapters. Examples of wireless protocols, among others, are used in personal area networks, such as IEEE 802.15 and Bluetooth, 4.0; wireless local area networks, such as IEEE 802.11-based wireless protocols; and cellular protocols.

The I/O adapter(s) 916 can also communicate with a solid-state drive ("SSD") 918 which includes memory module 204.

The I/O adapters 916 can include a Peripheral Component Interconnect Express (PCIe) adapter that is communicatively coupled using the NVMe (NVM Express) over PCIe (Peripheral Component Interconnect Express) protocol over bus 948 to the SSD 918. Non-Volatile Memory Express (NVMe) standards define a register level interface for host software to communicate with a non-volatile memory subsystem (for example, a Solid-state Drive (SSD)) over Peripheral Component Interconnect Express (PCIe), a high-speed serial computer expansion bus). The NVM Express standards are available at www.nvmexpress.org. The PCIe standards are available at www.pcisig.com.

Volatile memory 926 is memory whose state (and therefore the data stored on it) is indeterminate if power is interrupted to the device. Nonvolatile memory refers to memory whose state is determinate even if power is interrupted to the device. Dynamic volatile memory requires refreshing the data stored in the device to maintain state. One example of dynamic volatile memory includes DRAM (dynamic random access memory), or some variant such as synchronous DRAM (SDRAM). A memory subsystem as described herein may be compatible with a number of memory technologies, such as DDR3 (double data rate version 3, original release by JEDEC (Joint Electronic Device Engineering Council) on Jun. 27, 2007, currently on release 21), DDR4 (DDR version 4, JESD79-4 initial specification published in September 2012 by JEDEC), DDR4E (DDR version 4, extended, currently in discussion by JEDEC), LPDDR3 (low power DDR version 3, JESD209-3B, August 2013 by JEDEC), LPDDR4 (LOW POWER DOUBLE DATA RATE (LPDDR) version 4, JESD209-4, originally published by JEDEC in August 2014), WIO2 (Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5, originally published by JEDEC in January 2020, HBM2 (HBM version 2), originally published by JEDEC in January 2020, or others or combinations of memory technologies, and technologies based on derivatives or extensions of such specifications. The JEDEC standards are available at www.jedec.org.

The memory module 204 includes a byte-addressable, write-in-place memory that can be accessed by rows or columns, for example, Intel 3D XPoint™. Other examples of byte-addressable, write-in-place memory include, but are not limited to, single or multi-level Phase Change Memory (PCM) or phase change memory with a switch (PCMS), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other types of byte-addressable, write-in-place memory.

An operating system 946 is software that manages computer hardware and software including memory allocation and access to I/O devices. Examples of operating systems include Microsoft® Windows®, Linux®, iOS® and Android®.

Power source 942 provides power to the components of system 900. More specifically, power source 942 typically interfaces to one or multiple power supplies 944 in system 900 to provide power to the components of system 900. In one example, power supply 944 includes an AC to DC (alternating current to direct current) adapter to plug into a wall outlet. Such AC power can be renewable energy (e.g., solar power) power source 942. In one example, power source 942 includes a DC power source, such as an external AC to DC converter. In one example, power source 942 or power supply 944 includes wireless charging hardware to charge via proximity to a charging field. In one example, power source 942 can include an internal battery or fuel cell source.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

The following examples pertain to further embodiments. Specifics in the examples may be used anywhere in one or more embodiments.

Example 1 is an apparatus comprising R non-volatile memory dies. Each non-volatile memory die comprising a cross-point memory array having rows and columns of memory cells to store an array of bits, each column to store one-bit of a R-bit entry in an M-bit logical column. The apparatus includes circuitry to cause storage of R-bit entries in the M-bit logical column in the cross-point memory array diagonally across a partition having Q rows and Q columns in the cross-point memory array with a first R-bit entry in the M-bit logical column stored across the R non-volatile memory dies. Each bit of the first R-bit entry stored at a same physical row address and physical column address in one of the R non-volatile memory dies.

Example 2 includes the apparatus of Example 1, optionally, the circuitry is to read the M-bit logical column by reading one bit of the R-bit entry from a first physical row address and first physical column address from each of the R non-volatile memory dies in parallel and incrementing the first physical row address and the first physical column address by 1 to read the next R-bit entry by reading one bit of the next R-bit entry from each of the R non-volatile memory dies in parallel at a next physical row address and a next physical column address in each of the R non-volatile memory dies.

Example 3 includes the apparatus of Example 1, optionally the circuitry is to write the M-bit logical column by writing one bit of the R-bit entry to a first physical row address and first physical column address to each of the R non-volatile memory dies in parallel and incrementing the first physical row address and the first physical column address by 1 to write the next R-bit entry by writing one bit of the next R-bit entry to each of the R non-volatile memory dies in parallel at the next physical row address and next physical column address in each of the R non-volatile memory dies.

Example 4 includes the apparatus of Example 1 wherein Q=M/R.

Example 5 includes the apparatus of Example 1, wherein the M-bit logical column includes S data bits and T parity bits.

Example 6 includes the apparatus of Example 5, wherein the S data bits are stored in S/R contiguous partitions in the R non-volatile memory dies.

Example 7 includes the apparatus of Example 6, wherein the T parity bits are stored in T/R contiguous partitions in the R non-volatile memory dies contiguous with the S/R contiguous partitions.

Example 8 includes the apparatus of Example 1, wherein the array of bits is stored in contiguous physical rows in the cross-point memory array.

Example 9 is a system that includes a processor. The system includes R non-volatile memory dies, each non-volatile memory die comprising a cross-point memory array having rows and columns of memory cells to store an array of bits, each column to store one-bit of a R-bit entry in an M-bit logical column. The system includes circuitry to cause storage of the M-bit logical column in the cross-point memory array diagonally across a partition having Q rows and Q columns in the cross-point memory array with a first R-bit entry in the M-bit logical column stored across the R non-volatile memory dies, each bit of the first R-bit entry stored at a same physical row address and physical column address in one of the R non-volatile memory dies.

Example 10 includes the system of Example 9, wherein the circuitry is to read the M-bit logical column by reading one bit of the R-bit entry from a first physical row address and first physical column address from each of the R non-volatile memory dies in parallel and incrementing the first physical row address and the first physical column address by 1 to read the next R-bit entry by reading one bit of the next R-bit entry from each of the R non-volatile memory dies in parallel at a next physical row address and a next physical column address in each of the R non-volatile memory dies.

Example 11 includes the system of Example 9, wherein the circuitry is to write the M-bit logical column by writing one bit of the R-bit entry to a first physical row address and first physical column address to each of the R non-volatile memory dies in parallel and incrementing the first physical row address and the first physical column address by 1 to write the next R-bit entry by writing one bit of the next R-bit entry to each of the R non-volatile memory dies in parallel at the next physical row address and physical column address in each of the R non-volatile memory dies.

Example 12 includes the system of Example 9, wherein Q=M/R.

Example 13 includes the system of Example 9, wherein the M-bit logical column includes S data bits and T parity bits.

Example 14 includes the system of Example 13, wherein the S data bits are stored in S/R contiguous partitions in the R non-volatile memory dies.

Example 15 includes the system of Example 14, wherein the T parity bits are stored in T/R contiguous partitions in the R non-volatile memory dies contiguous with the S/R contiguous partitions.

Example 16 includes the system of Example 9, wherein the array of bits is stored in contiguous physical rows in the cross-point memory array.

Example 17 is a method including storing an array of bits in R non-volatile memory dies, each memory die comprising a cross-point memory array having rows and columns of memory cells to store an array of bits, each column to store one-bit of a R-bit entry in an M-bit logical column. The method causing storage of R-bit entries in the M-bit logical column in the cross-point memory array diagonally across a partition having Q rows and Q columns in the cross-point memory array with a first R-bit entry in the M-bit logical column stored across the R non-volatile memory dies, each bit of the first R-bit entry stored at a same physical row address and physical column address in one of the R non-volatile memory dies.

Example 18 includes the method of Example 17, further comprising reading the M-bit logical column by reading one bit of the first R-bit entry from a first physical row address and first physical column address from each of the R non-volatile memory dies in parallel and incrementing the first physical row address and the first physical column address by 1 to read the next R-bit entry by reading one bit of the next R-bit entry from each of the R non-volatile memory dies in parallel at a next physical row address and a next physical column address in each of the R non-volatile memory dies.

Example 19 includes the method of Example 17, further comprising writing the M-bit logical column by writing one bit of the R-bit entry to a first physical row address and first physical column address to each of the R non-volatile memory dies in parallel and incrementing the first physical row address and the first physical column address by 1 to write the next R-bit entry by writing one bit of the next R-bit entry to each of the R non-volatile memory dies in parallel at the next physical row address and physical column address in each of the R non-volatile memory dies.

Example 20 includes the method of Example 17, wherein Q=M/R. The M-bit logical column includes S data bits and T parity bits. The S data bits are stored in S/R contiguous partitions in the R non-volatile memory die. The T parity bits are stored in K/R contiguous partitions in the R non-volatile memory die contiguous with the S/R contiguous partitions.

Example 21 is an apparatus comprising means for performing the methods of any one of the Examples 17 to 20.

Example 22 is a machine readable medium including code, when executed, to cause a machine to perform the method of any one of claims 17 to 20.

Example 22 is a machine-readable storage including machine-readable instructions, when executed, to implement the method of any one of claims 17 to 20.

What is claimed is:
1. An apparatus comprising:
R non-volatile memory dies, each non-volatile memory die comprising a cross-point memory array having rows and columns of memory cells to store an array of bits, each column to store one-bit of a R-bit entry in an M-bit logical column; and circuitry to cause storage of R-bit entries in the M-bit logical column in the cross-point memory array diagonally across a partition having Q rows and Q columns in the cross-point memory array with a first R-bit entry in the M-bit logical column stored across the R non-volatile memory dies, each bit of the first R-bit entry stored at a same physical row address and physical column address in one of the R non-volatile memory dies.

2. The apparatus of claim 1, wherein the circuitry is to:
read the M-bit logical column by reading one bit of the R-bit entry from a first physical row address and first physical column address from each of the R non-volatile memory dies in parallel and incrementing the first physical row address and the first physical column address by 1 to read the next R-bit entry by reading one bit of the next R-bit entry from each of the R non-volatile memory dies in parallel at a next physical row address and a next physical column address in each of the R non-volatile memory dies.

3. The apparatus of claim 1, wherein the circuitry is to:
write the M-bit logical column by writing one bit of the R-bit entry to a first physical row address and first physical column address to each of the R non-volatile memory dies in parallel and incrementing the first physical row address and the first physical column address by 1 to write the next R-bit entry by writing one bit of the next R-bit entry to each of the R non-volatile memory dies in parallel at the next physical row address and next physical column address in each of the R non-volatile memory dies.

4. The apparatus of claim 1, wherein Q=M/R.

5. The apparatus of claim 1, wherein the M-bit logical column includes S data bits and T parity bits.

6. The apparatus of claim 5, wherein the S data bits are stored in S/R contiguous partitions in the R non-volatile memory dies.

7. The apparatus of claim 6, wherein the T parity bits are stored in T/R contiguous partitions in the R non-volatile memory dies contiguous with the S/R contiguous partitions.

8. The apparatus of claim 1, wherein the array of bits is stored in contiguous physical rows in the cross-point memory array.

9. A system comprising:
a processor;
R non-volatile memory dies, each non-volatile memory die comprising a cross-point memory array having rows and columns of memory cells to store an array of bits, each column to store one-bit of a R-bit entry in an M-bit logical column; and
circuitry to cause storage of the M-bit logical column in the cross-point memory array diagonally across a partition having Q rows and Q columns in the cross-point memory array with a first R-bit entry in the M-bit logical column stored across the R non-volatile memory dies, each bit of the first R-bit entry stored at a same physical row address and physical column address in one of the R non-volatile memory dies.

10. The system of claim 9, wherein the circuitry is to:
read the M-bit logical column by reading one bit of the R-bit entry from a first physical row address and first physical column address from each of the R non-volatile memory dies in parallel and incrementing the first physical row address and the first physical column address by 1 to read the next R-bit entry by reading one bit of the next R-bit entry from each of the R non-volatile memory dies in parallel at a next physical row address and a next physical column address in each of the R non-volatile memory dies.

11. The system of claim 9, wherein the circuitry is to:
write the M-bit logical column by writing one bit of the R-bit entry to a first physical row address and first physical column address to each of the R non-volatile memory dies in parallel and incrementing the first physical row address and the first physical column address by 1 to write the next R-bit entry by writing one bit of the next R-bit entry to each of the R non-volatile memory dies in parallel at the next physical row address and physical column address in each of the R non-volatile memory dies.

12. The system of claim 9, wherein Q=M/R.

13. The system of claim 9, wherein the M-bit logical column includes S data bits and T parity bits.

14. The system of claim 13, wherein the S data bits are stored in S/R contiguous partitions in the R non-volatile memory dies.

15. The system of claim 14, wherein the T parity bits are stored in T/R contiguous partitions in the R non-volatile memory dies contiguous with the S/R contiguous partitions.

16. The system of claim 9, wherein the array of bits is stored in contiguous physical rows in the cross-point memory array.

17. A method comprising:
storing an array of bits in R non-volatile memory dies, each memory die comprising a cross-point memory array having rows and columns of memory cells to store an array of bits, each column to store one-bit of a R-bit entry in an M-bit logical column; and
causing storage of R-bit entries in the M-bit logical column in the cross-point memory array diagonally across a partition having Q rows and Q columns in the cross-point memory array with a first R-bit entry in the M-bit logical column stored across the R non-volatile memory dies, each bit of the first R-bit entry stored at a same physical row address and physical column address in one of the R non-volatile memory dies.

18. The method of claim 17, further comprising:
reading the M-bit logical column by reading one bit of the first R-bit entry from a first physical row address and first physical column address from each of the R non-volatile memory dies in parallel and incrementing the first physical row address and the first physical column address by 1 to read the next R-bit entry by reading one bit of the next R-bit entry from each of the R non-volatile memory dies in parallel at a next physical row address and a next physical column address in each of the R non-volatile memory dies.

19. The method of claim 17, further comprising:
writing the M-bit logical column by writing one bit of the R-bit entry to a first physical row address and first physical column address to each of the R non-volatile memory dies in parallel and incrementing the first physical row address and the first physical column address by 1 to write the next R-bit entry by writing one bit of the next R-bit entry to each of the R non-volatile memory dies in parallel at the next physical row address and physical column address in each of the R non-volatile memory dies.

20. The method of claim 17, wherein Q=M/R, the M-bit logical column includes S data bits and T parity bits, the S data bits are stored in S/R contiguous partitions in the R non-volatile memory die, the T parity bits are stored in K/R contiguous partitions in the R non-volatile memory die contiguous with the S/R contiguous partitions.

* * * * *